Figure 1:
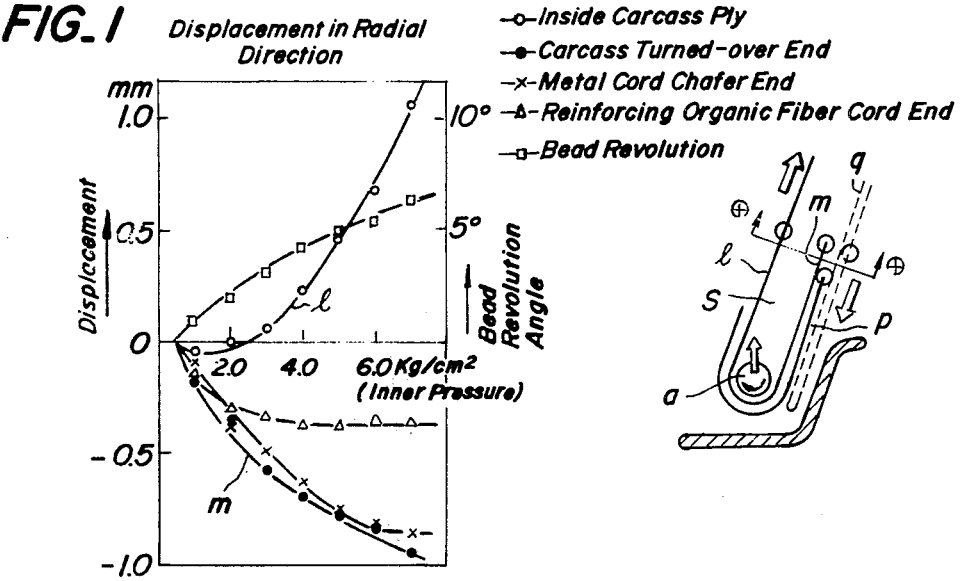

United States Patent [19]

Motomura et al.

[11] 4,215,737
[45] Aug. 5, 1980

[54] STRUCTURE FOR REINFORCING BEAD SECTIONS OF RADIAL TIRES FOR HEAVY LOADS

[75] Inventors: Kenichi Motomura, Higashi-Murayama; Mitsuhisa Yahagi, Sayama; Toshiyuki Sogi, Higashi-Yamato, all of Japan

[73] Assignee: Bridgestone Tire Company Limited, Tokyo, Japan

[21] Appl. No.: 916,429

[22] Filed: Jun. 16, 1978

[30] Foreign Application Priority Data

Jul. 5, 1977 [JP] Japan .................................. 52-80287

[51] Int. Cl.² .................... B60C 15/00; B60C 15/06
[52] U.S. Cl. .......................... 152/362 R; 152/362 CS
[58] Field of Search ............. 152/374, 362 R, 362 CS, 152/354 R

[56] References Cited

U.S. PATENT DOCUMENTS

| | | | |
|---|---|---|---|
| 3,557,860 | 1/1971 | Maiocchi | 152/362 R |
| 3,895,666 | 7/1975 | Inoue | 152/362 R |
| 3,921,693 | 11/1975 | Suzuki et al. | 152/354 |
| 3,964,533 | 6/1976 | Arimura | 152/362 R |
| 4,046,183 | 9/1977 | Takahashi | 152/362 R |
| 4,085,787 | 4/1978 | Maiocchi | 152/374 |
| 4,093,014 | 6/1978 | Tomoda et al. | 152/362 R |
| 4,120,338 | 10/1978 | Mirtain | 152/374 |

FOREIGN PATENT DOCUMENTS 2727875  12/1977  Fed. Rep. of Germany .... 152/362 CS
44122   11/1924  Japan.

*Primary Examiner*—John E. Kittle
*Attorney, Agent, or Firm*—Sughrue, Rothwell, Mion, Zinn and Macpeak

[57] ABSTRACT

Reinforcing structure at bead sections of radial tires for heavy load comprising
(1) at least one carcass ply
(2) at least one chafer
(3) a circular triangular composite rubber stiffener composed of a lower half portion having a higher modulus and an upper half portion having a lower modulus, which is disposed between a case main portion and the turned-over carcass ply portion and
(4) a reinforcing member composed of at least two rubberized organic fiber cord layers arranged at the case main portion, the inward end in the radial direction of said reinforcing member being locked with the bead base and said reinforcing member being disposed along a circular region having a given height at the case main portion.

9 Claims, 7 Drawing Figures

FIG_3

FIG_7
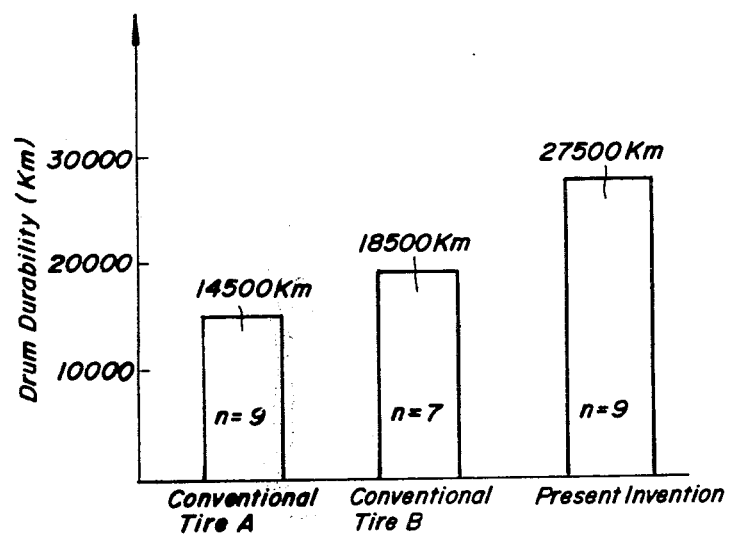

STRUCTURE FOR REINFORCING BEAD SECTIONS OF RADIAL TIRES FOR HEAVY LOADS

The present invention relates to an improvement of a structure for reinforcing bead sections of radial tires and particularly radial tires for heavy loads.

Radial tires wherein cords of carcass plies turning a bead core from the inside to the outside of tires are arranged in radial plane of a tire or semiradial tires wherein the cords of carcass plies are inclined at an angle of 10° to 20°, at the largest angle of less than 30° with respect to the radial plane, have a weak resistance to the lateral force acting on the tires. Therefore, specific account has been taken into with respect to reinforcement of bead sections and for example, these means have been disclosed in Japanese Pat. No. 49-44,122 and U.S. Pat. No. 3,964,533 and the tires disclosed in these patents are referred to as the former patent and the latter patent respectively hereinafter.

The former patent is characterized in that a chafer composed of metal cords is disposed at the outside of the turned-over carcass ply and reinforcing fiber layers wherein two or more layers are crossed with each other, are arranged at the outside of the chafer and extend upwardly from the bead base to the position where the breadth of the tire is a maximum. The end of the turned-over carcass ply is completely covered and a rubber layer is disposed between the carcass ply and the turned-over carcass ply and the reinforcing fiber layers with the rubber layer gradually decreasing the thickness towards the side wall of the tire.

The latter patent relates to a pneumatic radial type tire having at least one carcass ply composed of metal cords in a substantially radial arrangement and a pair of bead sections. Each of the bead sections comprises a turned-over portion folded carcass ply around a bead core from inward to outward of the tire, at least one chafer consisting of rubberized metal cords arranged along and adjacent to the turned-over portion of the carcass ply, a rubber stiffener disposed between the carcass ply and its turned-over portion with the chafer and extending outwardly from the vicinity of the bead core beyond outermost cord ends of the turned-over portion and of the chafer in radial direction of the tire. A carcass reinforcing member composed of at least two rubberized cord fabrics or organic fibers is secured to the surface of the carcass ply and is crossed with each other in their laminate interface. The carcass reinforcing member located opposite to the outermost cord ends of the turned-over portion of the carcass ply and of the chafer in radial direction of the tire by a given width has a cord angle of at least 60° with respect to the direction of the cord of the carcass ply in each cord fabric. The angle is larger at the outer portion than at the inner portion in radial direction of the tire, and the rubber stiffener disposed between the turned-over portion of the carcass ply with the chafer and the carcass secured with the carcass reinforcing member is composed of a composite of a hard rubber stock in the side of the turned-over portion and a composite of a relatively soft rubber stock. The difference in hardness between the hard rubber stock and the soft rubber stock being more than 10 of Shore A hardness, in the side of the carcass reinforcing member, the relatively soft rubber stock extending along the carcass reinforcing member from its corresponding inside portion to outward beyond upper portion thereof in radial direction of the tire to protect the outermost cord ends of the turned-over portion and the chafer from strain of the stiffner which yields by pressure between the carcass ply and a rim flange and from divergence between the cords of the carcass ply when the inflated radial type tire is subjected to service under load.

The present invention relates to the structure for reinforcing the bead sections of these radial tires and discloses a novel development to advantageously improve the durability of the bead sections.

These types of radial tires use metal cords, particularly steel cords as the carcass ply in many cases, whereby these tires can be repeatedly used by renewing the tire tread. However, this depends upon the durability of the bead sections and the above described known tires do not satisfy this requirement.

On the other hand, these tires have been used under heavy loads and severe conditions and frequently used under the more severe conditions for saving personal expenses. Therefore, more improvement of the durability of the bead sections, the weak point of the radial tires, has been demanded.

In the bead section of the tire of the above described former patent, as mentioned above a wire chafer and organic fiber cord layers covering the end of the turned-over carcass ply and the end of the wire chafer cord is arranged at the outside of the turned-over carcass ply portion, so that the bead section becomes thick and the heat is apt to be generated and the cord end of the organic fiber cord layers is apt to become the cause of generation of separation due to stress concentration together with the ends of the carcass and the chafer.

In the tires of the latter patent, as mentioned above, a reinforcing member composed of organic fiber cord layers is opposed to the ends of the carcass and the chafer and a rubber stiffener is put between the reinforcing member and the above described ends and the reinforcing member is secured to the outside of the carcass ply. This tire is somewhat more advantageous with respect to the above described problem based on the deformation of the bead section than the tire of the former patent but the reinforcing member is partially secured to the outside of the carcass and therefore the reinforcing effect of the reinforcing member itself is low and the detachment of the reinforcing member from the carcass ply and the separation of the reinforcing member itself are liable to be caused under the severe use conditions, because the effect for preventing the deformation at the bead section owing to the reinforcing member is not sufficient, and further the arrangement of this reinforcing member is disadvantageous in view of the productivity of the tire formation.

An object of the present invention is to advantageously obviate the drawbacks of the above described prior art, to decrease the arrangement of the reinforcing member causing the separation at the outside of the bead core as far as possible, to decrease the heat generation at the bead section as far as possible, to give the effective and full reinforcing effect to the bead section and to increase the durability of the bead section necessary under the particularly severe use conditions, whereby the tire can be reused by exchanging the tread portion.

In general, the arrangement of the cords at the carcass ply of the radial tire is significantly different from the arrangement of the bias structure and every ply cords are mutually independent at the carcass main portion and the turned-over carcass portion excluding the tread portion and independently behavior attending to the deformation of the tire. In particular, the side portion of the tire is flexible and the flexing in the direction parallel to the revolution axle of the tire is very large and the longitudinal flexing at the ground contact area of the tire is far larger than that of the bias tire.

The behavior of the carcass ply when the tire is inflated is explained with respect to the tire of the former patent with reference to FIG. 1. The main portion of the carcass, that is the ply cord l at the inside is pushed outwardly of the radial direction of the tire considering the bead core a to be center and the turned-over carcass portion, that is the ply cord m at the outside is pushed inwardly of the radial direction and so called the "slip out ply" phenomenon is caused.

Accordingly, the reinforcing layer composed of metal cords, that is wire chafer P and the reinforcing layer composed of the organic fiber cords, that is the fabric chafer q, which are arranged adjacent to the turned-over carcass cord m, move together with the ply cord m and this movement is illustrated by FIG. 1 in the relation of the displacement to the inner pressure at the vicinity of the end of the turned-over carcass ply cord.

On the other hand, by the deformation of the tire due to the inflation, the shear deformation is caused at the rubber stiffeners and the bead core a revolves and the degree is shown in FIG. 1.

Figure 2:
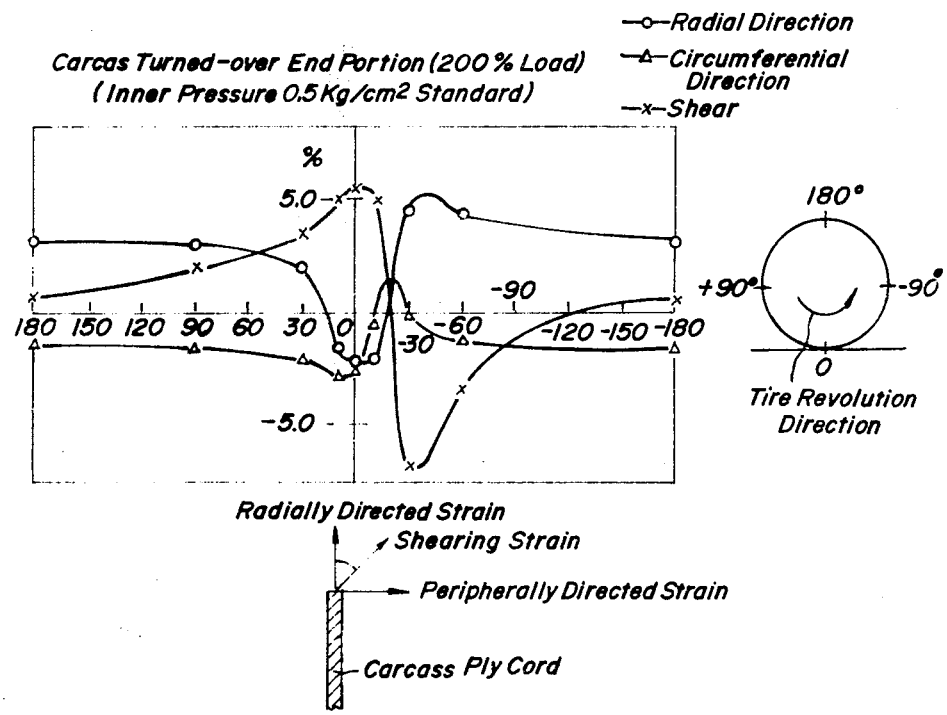

An embodiment of the strain distribution in the radial direction, the circumferential direction and the shear direction, which is caused at the end of the turned-over carcass portion when the tire contacts with ground and revolves, is shown in FIG. 2. As seen from FIG. 2, a great variation including the reverse of symbol between the bisecting point 0° of the ground contact area of the tread portion of the tire and the forward and backward areas is caused and such a deformation that the bead section falls toward the rim flange attending to the bending deformation in which the side portion expands, is caused at the bead section by the maximum longitudinal flexing at the ground contact area. This is repeated by contacting the tire with ground and revolving the tire, so that the heat generation of the bead is brought about, whereby the above described strain is increased.

In FIG. 2, the ordinate shows the strain at the turned-over carcass ply end and the abscissa shows the position of the strain gauge (angle when the position immediate below the load is 0°).

The plus direction of the ordinate shows the tension strain and the minus direction shows the compression strain. The plus side of the abscissa shows the toe side and minus side shows the heel side.

Since the measurement is made under the state where the tire revolves at a constant speed, the position immediately below the load is not always a point symmetry, but generally speaking, the wave shape of the strain is odd functional and the carcass ply cord moves as in a pulley around the bead wires and this phenomenon is referred to as "pulley effect".

As seen from this fact, the main portion l and the turned-over portion m of the carcass ply are alternately pulled in the opposite direction along the bead core a as in a rope which is wrapped around a stationary pulley in a half circumference and show the pulley behavior.

Regarding the pulley behavior, the conventional tire of the latter patent is same as the above explained conventional tire of the former patent and the effect of the reinforcing member for preventing the pulley behavior cannot be substantially expected. Because in order to prevent the divergence of the distance of arrangement between the mutual carcass ply cords particularly at the upper portion of the bead, the cords of the reinforcing member are crossed with the carcass ply cords at a fairly large angle of more than 60°, particularly 70° to 80°. Therefore the reinforcing member follows to the main portion of the carcass in the movement of the radial direction.

The inventors have found by the experimental results that it is not preferable in order to restrain the pulley behavior that the above described cross angle be large.

In both tires of the former patent and the latter patent, the above described falling of the bead section owing to the load of tire, the deformation, particularly the shear deformation of the stiffener due to the inflation, the divergence of the carcass ply cords, and the variation of angle of the metal cord reinforcing layer owing to the falling are added and thus the stress (strain) concentration is caused due to the compression at the end of the turned-over carcass ply and the outward end in the radial direction of the reinforcing member composed of organic fiber cords and each end of the above described members becomes the cause of rupture based on the difference of Young's modulus from rubber. It is apparent that the reinforcing member having a large crossing face with respect to the carcass ply is advantageous for preventing the divergence of the carcass ply.

The reinforcing member composed of metal cords is the essential constituting member in the bead structure of these type tires at the outside of the bead core in view of various points. The inventors have studied the behavior of the bead section of the pneumatic tire having a radial carcass composed of metal cords and the present invention is to provide pneumatic tires having a considerably high durability and a more simple bead structure than the prior tires in which the above described pulley behavior and the deformation when the tires are revolved under load are effectively restrained, the arrangement of the members at the outside of the bead core axial direction which becomes the cause of separation is made to be the necessary minimum limitation and a good rigidity balance is taken.

The present invention includes in pneumatic radial tires for heavy loads which have at least one radially or semiradially arranged carcass cord layer turned around a bead core from the inside of the tire to the outside, a rubber stiffener having a substantially triangular cross-sectional shape, which is disposed between the carcass ply cord and the turned-over carcass ply and extends from the base end of the bead core outwardly of the radial direction of the tire. A chafer is composed of at least one layer of metal cords at the above described turned-over area and a reinforcing member composed of at least two layers of organic fiber cords crossing with the carcass ply and disposed at the inside of the axial direction of the bead core. The stiffener comprises a composite stiffener composed of a half lower rubber stock having a higher modulus and a half upper rubber stock having a lower modulus, the end of the turned-over carcass ply contacting with the lower modulus rubber stiffener. The chafer is disposed at the outside of the axial direction with respect to the turned-over carcass portion and crossed with the ply cord of the turned-over carcass ply, the outward end of the radial direction of said chafer being lower than the turned-over carcass ply end. The chafer is disposed along the turned-over portion over a circular region of a radial height $h_2$ of 0.6 to 0.94 time, preferably 0.75 to 0.9 time as high as the height $h_0$ of the turned-over carcass ply end perpendicular from the bead base.

The upper end in the radial direction of the chafer composed of metal cords in the bead structure of the conventional tires is higher than the turned-over carcass ply end and the rigidity of the bead section is high, so that the resistance to wear of the bead section due to friction with the rim is high but there is a problem in the durability and trouble occurs at the upper end of the above described chafer where the difference of rigidity is large and more improvement of the durability has been demanded.

Figure 3:
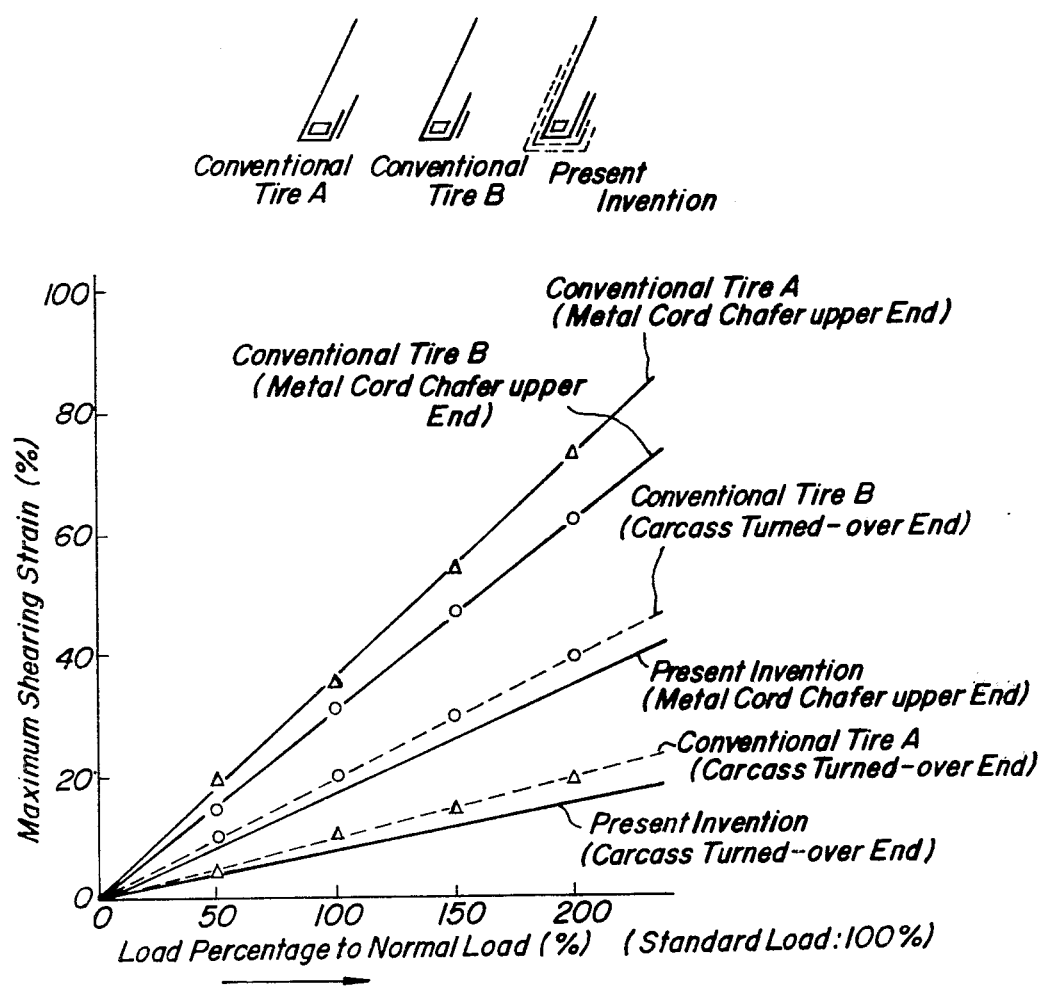

Therefore, the inventors have made various investigations for improving the durability of the bead section and it has been found that by making the upper end of the chafer lower than the turned-over carcass ply end, the strain at the upper end of the chafer which has been the cause of the trouble as shown in FIG. 3, becomes smaller and the generation of the trouble is greatly decreased. But, by lowering the height of the chafer, the rigidity of the bead section lowers and the resistance to wear of the bead section due to friction with the rim also lowers.

Namely, the deformation of the bead section becomes larger by lowering the rigidity of the bead section and remains the structural problem in the resistance to wear of the bead section due to friction with the rim. It has been found that in order to solve these problems while maintaining the merit of the above described structure and to restrain the deformation of the bead section having a close relation to the resistance to wear of the bead section due to friction with the rim, at least two fiber reinforcing layers arranged in bias are disposed adjacent to the carcass ply, the inward end portion of the fiber reinforcing layers is secured to the bead base and said reinforcing layers are disposed along the case main portion over the circular region of a radial height $h_1$ of 0.85 to 2.6 times as high as the height $h_2$ of the upper end of the chafer in the radial direction perpendicular from the bead base. Hence, the deformation of the bead section can be made small and the wear of the bead section due to friction with the rim can be restrained. It has been found by a measuring test that when the height $h_1$ of the reinforcing fiber layers exceeds a given value, the deformation of the bead section becomes suddenly small and when the height is not less than 0.85 $h_2$, the deformation of the bead section becomes small and the generation of the above described wear of the bead section due to the rim is prevented and the durability also is greatly improved.

Furthermore, it is preferable to dispose a substantially elongated top rubber piece extending beyond the turned-over carcass ply end in contact with the outward end in the radial direction of the chafer and this rubber piece has substantially the same thickness as the thickness of the chafer composed of metal cords and has 50–90 kg/cm² at 100% modulus. The reinforcing member composed of the organic fiber layers are secured to the carcass ply at the inside with respect to the bead core and the cords are crossed with one another and crossed to the carcass ply at an angle of 50°–60° near the position of the point crossing to the axial direction line passing the turnover end of the carcass ply and the height $h_1$ of an outward end in the radial direction of the reinforcing member from the bead base is 0.85–2.6 times as high as the height $h_2$ of the chafer end composed of metal cords from the bead base and another inward end of the reinforcing member is substantially locked with the bead core and does not extend beyond the outward end $2a$ in the radial direction of the chafer and 100% modulus of the coating rubber of the cords forming the reinforcing member is 45–90 kg/cm².

The bead structure of the tire according to the present invention is simplified by disposing the reinforcing member at the inside in the axial direction so as to effectively restrain the "pulley behavior" and the "deformation" due to the stress concentration at the turned-over carcass ply end and the chafer end. To simplify the outside in the axial direction of the bead core, the chafer composed of metal cords which are advantageous in the bending rigidity, is disposed at the outside in the axial direction of the bead core, and an elongated rubber piece effective for preventing the separation is disposed at the outward end in the radial direction of the chafer. The effective composite rubber stiffener is placed between the main carcass ply and the turned-over carcass ply.

The present invention will be explained in more detail.

Figure 4:
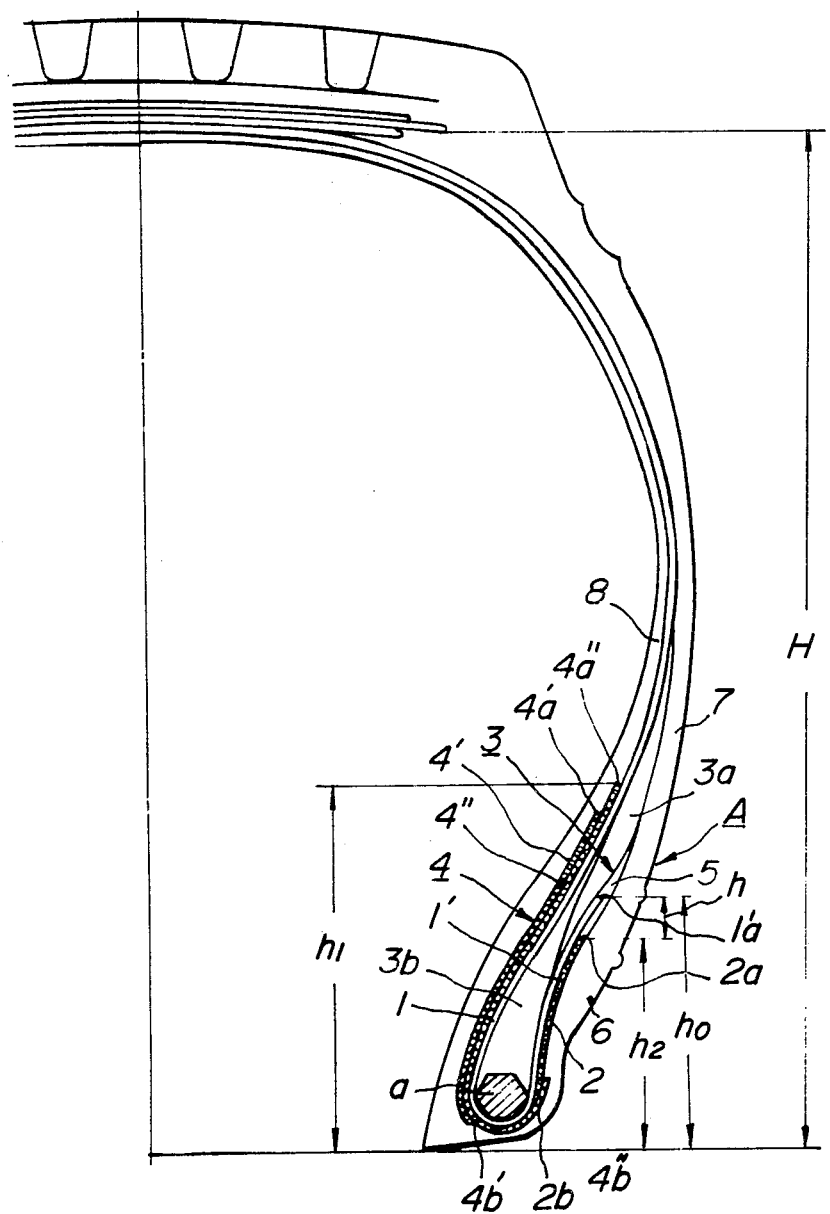
Figure 5:
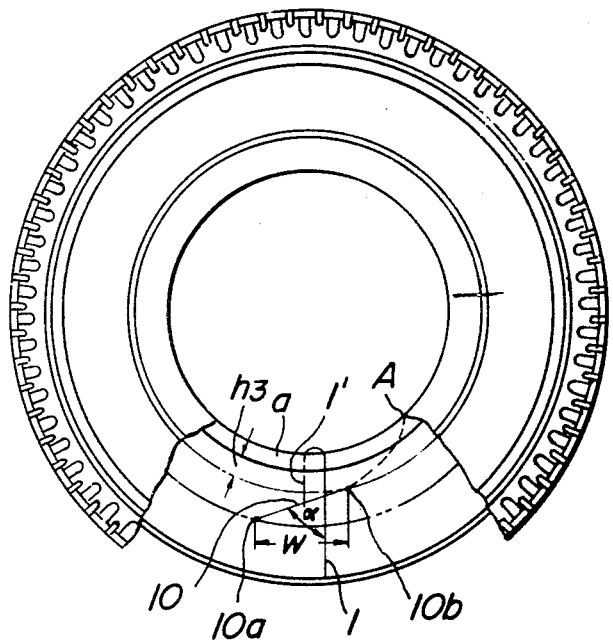
Figure 6:
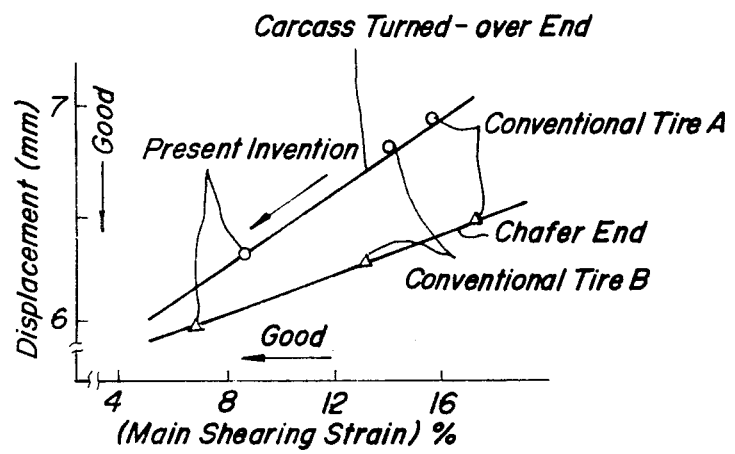

For a better understanding of the invention, reference is taken to the accompanying drawings, wherein:

FIG. 1 is a graph showing the relation of the displacement of the bead section to the charged inner pressure when a radial tire for heavy loads is inflated, FIG. 2 is a graph showing the strain distribution at the ground contact area and the foreward and backward areas under 200% load, FIG. 3 is a diagramatical view showing the shear strains at the metal cord end of the conventional tires and the tire of the present invention, FIG. 4 is a cross-sectional view of a half part of the tire of an example of the present invention, FIG. 5 is a side view showing the essential construction of a conventional tire, FIG. 6 is a graph showing the results of the chamber test and FIG. 7 is a diagramatical view showing the results of the drum durable test.

The inventors have made various investigations from the whole bead section for the purpose that various reinforcing members at the outside in the axial direction of the bead core are made to be the necessary minimum members in order to avoid the stress concentration due to compression during revolution under load. It has been found that as shown in FIG. 4, in order to mitigate the rigidity balance to the upper half portion from the bead base end of the bead section A and the stress concentration at the turned-over carcass ply end $1'a$ and the outward end $2a$ in the radial direction of the chafer 2 composed of metal cords. The rubber stiffener 3 is preferably composed of a lower half portion of a rubber stiffener $3b$ having a higher modulus and an upper half portion of a rubber stiffener $3a$ having a lower modulus and it is preferable that the turned-over carcass ply end $1'a$ substantially contacts with the above described rubber stiffener $3a$ having a lower modulus in view of dispersion of stress.

Investigations have been made with respect to the modulus of the stiffener 3 and it has been found that 100% modulus of the higher modulus rubber stiffener $3b$ must be at least 60 kg/cm² in view of the rigidity of the bead base and that 100% modulus of the lower modulus rubber stiffener must be 15–50 kg/cm² in order to gradually decrease the rigidity outwardly of the radial direction and mitigate the stress concentration at the turned-over carcass ply end $1'a$ and the outward end $2a$ in the radial direction of the chafer 2.

Furthermore, the chafer 2 composed of metal cords, which is essential in this type tire, is arranged at the turned-over carcass ply portion which is turned outwardly of the axial direction of the bead core a, that is at the outside of ply $1'$.

This chafer is an inevitable member for preventing the wear of the bead section due to friction with the rim and improving the rigidity at the bead base.

The end portion $2a$ of the chafer 2 is liable to be subjected to the stress concentration as mentioned above, because the chafer 2 is crossed with the turned-over carcass ply $1'$ at a given angle. The inventors have made various investigations for solving this drawback and it has been found that the height $h_2$ of the chafer 2 from the bead base is preferred to be lower than the turned-over carcass ply end $1'a$ and to be not less than 3/5 of the height $h_0$ of the turned-over carcass ply end $1'a$ from the bead base.

It has been found that when the chafer end $2a$ is higher than the turned-over carcass ply end $1'a$, the stress concentration is caused at the chafer end $2a$, while when said height is less than 3/5, the resistance to wear of the bead base due to friction with the rim, the rigidity of the bead section A and the like are deficient.

It is preferable that the chafer is crossed with the turned-over carcass ply $1'$ at an angle of 45°–80°, preferably 55°–65° in view of the rigidity of the bead section and the separation of the chafer end $2a$.

It has been found that 100% modulus of the coating rubber of the chafer 2 is preferred to be 45–90 kg/cm$^2$, more preferably 55–80 kg/cm$^2$.

The modulus of less than 45 kg/cm$^2$ is not preferable in view of the separation of the chafer end $2a$ due to the whole rigidity, movement and the like and the modulus of more than 90 kg/cm$^2$ is not preferable in view of the production and the rigidity balance with the other members.

Furthermore, it has been found that the stress concentration of the turned-over carcass ply end $1'a$ and the chafer end $2a$ due to compression upon deformation can be mitigated by disposing an elongated rubber piece, that is a top rubber piece 5 in contact with the outward end $2a$ in the radial direction of the chafer 2 to extend beyond the turned-over carcass ply end $1'a$.

It is preferable that the top rubber piece 5 has substantially the same thickness as the chafer 2, 50–90 kg/cm$^2$ at 100% modulus and a crack growth rate of less than $3.0 \times 10^{-5}$ cm/cycle.

The crack growth rate is used for estimating the plysical properties of rubber and is measured as follows. A given crack (1 mm) is given to a test piece (JIS K 6301), to which a given tear energy T (kg/cm) is applied and the crack growth rate (cm/cycle) is measured.

It has been found by various experiments that when 100% modulus of the top rubber pieces is less than 60 kg/cm$^2$, the stress concentration of the turned-over carcass end $1'a$ can not be mitigated and when said modulus is more than 90 kg/cm$^2$, the crack growth rate is large and cracks are readily caused at the turned-over carcass ply end.

The inventors have confirmed that the durability of the bead section can be improved by simplifying the structure of the outside of the axial direction of the bead core a in this manner.

Concerning "pulley behavior" and "deformation owing to revolution under load", which are most important in this type tire, these problems have never been completely solved in the above explained tire and the object of the present invention can be accomplished by making the bead structure to restrain a variety of deformations and obtaining the rigidity balance as the bead section together with simplifying the structure.

Accordingly, an explanation will be made with respect to the fiber cord reinforcing member 4, which is the most important one of the present invention.

It has been found that it is preferable that as shown in FIG. 4, the tires of the present invention are provided with the reinforcing member 4 which is secured to the carcass ply 1 at the inside in the axial direction of the bead core a. The reinforcing member 4 is composed of fiber layers $4'$ and $4''$ and is crossed with the carcass ply 1 at 50°–60° near the position of the point crossing to the axial direction line passing the turnover end of the carcass ply. Both the layers are mutually crossed and extend from the bead base and the height $h_1$ of the higher outward end in the radial direction among $4'a$ and $4''a$ is 0.85–2.6 times as high as the height $h_2$ of the chafer end $2a$ composed of metal cords from the bead base and another inward ends $4'b$ and $4''b$ are locked substantially with the bead core a. Preferably said reinforcing member is partially overlapped with the inward end $2b$ in the radial direction of the chafer 2 and must not extend beyond the outward end $2a$ in the radial direction of the chafer 2. It is preferable that 100% modulus of the coating rubber of each layer $4'$ and $4''$ of the reinforcing member 4 is 40–80 kg/cm$^2$, more preferably 45–70 kg/cm$^2$.

By arranging the reinforcing member 4 to the carcass ply 1 in this manner, the divergence of the carcass ply 1 in the circumferential direction can be most effectively prevented and it is necessary in view of the rigidity and the functional effect to cross the carcass ply 1 with each layer $4'$ and $4''$ of the reinforcing member 4 and to cross the layers $4'$ and $4''$ with each other. When the cross angle is less than 50°, there is no effect for preventing the divergence of the carcass ply 1, while when said angle is more than 60°, the effect for preventing the "pulley behavior" is small and further there is problem in the production. When the height of the outward ends $4'a$ and $4''a$ in the radial direction is less than 0.85 $h_2$, the effect for preventing the divergence of the carcass ply 1 becomes fairly small and the deformation during the revolution under load can not be effectively prevented. When said height is more than 2.6 $h_2$, the ends $4'a$ and $4''a$ of the reinforcing member 4 position at the upper end of the side wall where the deformation is large and the separation is caused and further trouble in view of the production occurs.

The inward ends $4'b$ and $4''b$ in the radial direction of the reinforcing member 4 must be extended to the position where said ends are locked with the bead core a, that is to the point where said ends are overlapped with the bead core, in view of restraining various deformations.

A further explanation will be made by using FIG. 5 with respect to this point. FIG. 5 is a side view of this type tire, wherein a part of the outer skin rubber is removed. According to the tire of the latter patent, a cord 10 forming the reinforcing member 4 has an inward end $10b$ having a given height $h_3$ from the bead core a. However, this prior art has the effect for preventing the divergence of the carcass ply as mentioned above, but has substantially no effect against the "pulley behavior".

Thus, the inventors have made various investigations and found that if the end of the cord 10 is extended to the point where said cord is locked with the bead core, that is, to 10a—A even at the same angle, the pulley behavior and the deformation can be effectively prevented and the stress and the force can be broadly dispersed. That is, when the cord end of the reinforcing member starts from a point of a given distance $h_0$ from the bead base, the effective width W of the cord 10 of the reinforcing member 4 (the end is not locked and free, so that the width which is practically effective as the reinforcement is far narrower than the apparent width) is very narrow. When the cord end of the reinforcing member is extended to the bead base and locked with the bead base as in the present invention, the effective width of the cord of the reinforcing member is able to become very broad without sacrificing solution of the other problems.

It has been found that when 100% modulus of the coating rubber constituting the layers 4' and 4'' is less than 40 kg/cm$^2$, it is not preferable in view of the above described various problems and when said modulus is more than 80 kg/cm$^2$, it is not preferable in view of production and adhesion.

It is preferable in view of productivity and quality that as shown in FIG. 4, a part of the inward ends 4'b and 4''b is overlapped with the inward end 2b of the chafer 2 composed of metal cords.

By the above described construction of the reinforcing member 4, the reverse problems in the conventional tires are concurrently satisfied and the productivity and the performance and the like are fully developed. The above described simple structure at the outside in the axial direction of the bead core a develops unexpected advantage in the cost, performance and the like as compared with the conventional complicated bead structures.

EXAMPLE

1. Tire size: TBR 1000R20 14PR
2. Breaker cord: Conventional general structure composed of metal cords.
3. Carcass ply:
   (1) Steel wire
   (2) Ply turned-over height $h_0 = 63$ mm $(=0.26H, H=240$ mm$)$ 4. Bead reinforcement:
   (a) Fiber reinforcing member
      (1) Nylon cord
      (2) Two layers
      (3) Cross cord angle ±56°
      (4) 100% modulus of the coating rubber: 56 kg/cm$^2$
      (5) Height in the radial direction $h_1 = 95$ mm $(\simeq 1.5\ h_0)$ (b) Wire chafer: Steel cord
      (1) Cord angle 60°
      (2) Height of the chafer upper end $h_2 = 53$ mm $(=0.84\ h_0)$ (3) 100% modulus of the coating rubber: 65 kg/cm$^2$ (c) Top rubber
      100% modulus: 63 kg/cm$^2$ The results of the chamber test of tire of the present invention are shown in FIG. 6 and the conventional tire A means one of Japanese Pat. No. 842,054 and the conventional tire B means on of U.S. Pat. No. 3,964,533.

As seen from FIG. 6, the tire of the present invention positions in the better direction in both the displacement and the strain.

The results of the drum durable test carried out based on this chamber test are shown in FIG. 7.

The results of this test show that the tire of the present invention is few in the trouble generation even under severe use conditions and has excellent durability at the bead section.

What is claimed is:

1. A reinforcing structure at bead sections of radial tires for heavy loads, comprising;
   (1) at least one carcass ply composed of rubberized cord layer arranged radially or semiradially, which is turned around a bead cord from inside to outside of the tire,
   (2) a circular composite rubber stiffener being disposed between a case main portion formed by the carcass ply and the turned-over carcass protion, extending outwardly in radial direction of the tire from bottom end adjacent to the bead core and composed of a lower half rubber stock portion having a higher modulus and an upper half rubber stock portion having a lower modulus, said upper half portion being arranged along the end portion of the inside of the turned-over carcass ply,
   (3) at least one chafer composed of rubberized metal cords crossed with the ply cords being disposed in a circular region at the outside of the turned-over carcass ply so that said chafer end does not extend to the turned-over carcass ply end, and
   (4) a reinforcing member composed of at least two rubberized organic fiber cord layers arranged in bias, which are disposed directly in contact with the composite stiffener along the case main portion or secured to the inside of the ply cord of the case main portion and crossed with the ply cord and crossed with each other, said reinforcing member being locked with the bead base and disposed along a circular region of a radial height $h_1$ of said reinforcing member end from the bead base being 0.85–2.6 times as high as a perpendicular height $h_2$ of the upper end of the chafer from the bead base, the organic fiber cord being crossed at an angle of 50° to 60° with respect to the ply cord of the main case portion near the position of the point crossing to the axial direction line passing the turn-over end of the carcass ply.

2. The reinforcing structure at bead sections as claimed in claim 1, wherein the chafer is disposed along the turned-over carcass ply over a circular region of a height $h_2$ in the radial direction of 0.6–0.94 time as high as a perpendicular height $h_0$ of the turned-over carcass ply end from the bead base.

3. The reinforcing structure at bead sections as claimed in claim 1, wherein the coating rubber of the organic fiber cord of the reinforcing member has a modulus at 100% elongation of 40–80 kg/cm$^2$, preferably 45–75 kg/cm$^2$.

4. The reinforcing structure at bead sections as claimed in claim 1, wherein the fiber reinforcing member is disposed along the inside of the case main portion.

5. The reinforcing structure at bead sections as claimed in claim 1, wherein the fiber reinforcing member is turned around the bead core from the inside to the outside together with the carcass ply and overlapped slightly on the chafer.

6. The reinforcing structure at bead sections as claimed in claim 1, wherein the coating rubber of the metal cord of the chafer has a modulus at 100% elongation of 45–90 kg/cm$^2$, preferably 55–80 kg/cm$^2$.

7. The reinforcing structure at bead sections as claimed in claim 1, wherein an angle of arrangement of the metal cord of the chafer is 45°–80°, preferably 55°–65° with respect to the ply cord of the turned-over carcass ply.

8. The reinforcing structure at bead sections as claimed in claim 1, wherein the lower half portion rubber stock and the upper half portion rubber stock of the stiffener have modulus at 100% elongation of 15–50 kg/cm$^2$ and more than 60 kg/cm$^2$ respectively.

9. The reinforcing structure at bead sections as claimed in claim 1, wherein a hat rubber having a modulus at 100% elongation of 50–90 kg/cm$^2$ and a crack growth rate dc/dr of $3.0 \times 15^{-5}$ cm/cycle is disposed so as to cover at least one end of the turned-over carcass ply end positioning along the upper half stiffener portion and the metal cord end of the chafer.

* * * * *